W. E. BEEDE.
CIRCUIT INDICATOR.
APPLICATION FILED JAN. 17, 1914.
1,248,246.
Patented Nov. 27, 1917.
2 SHEETS—SHEET 1.
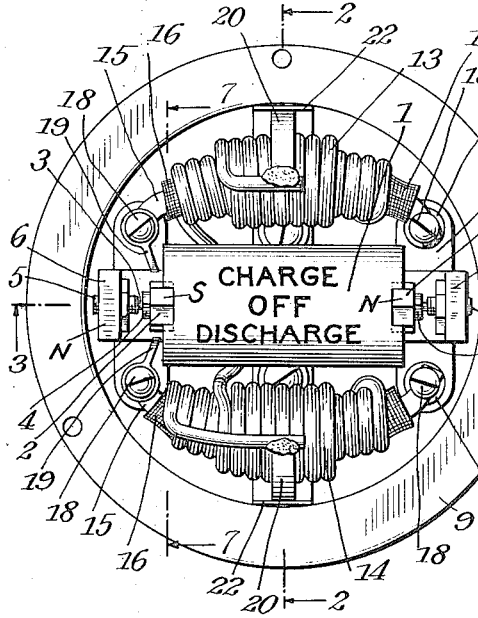
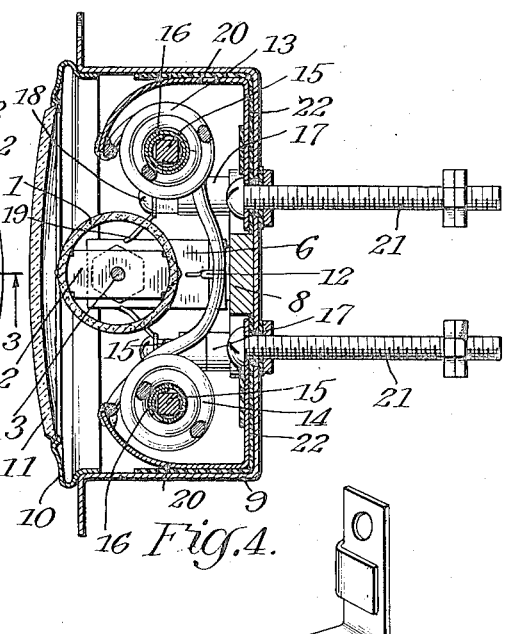
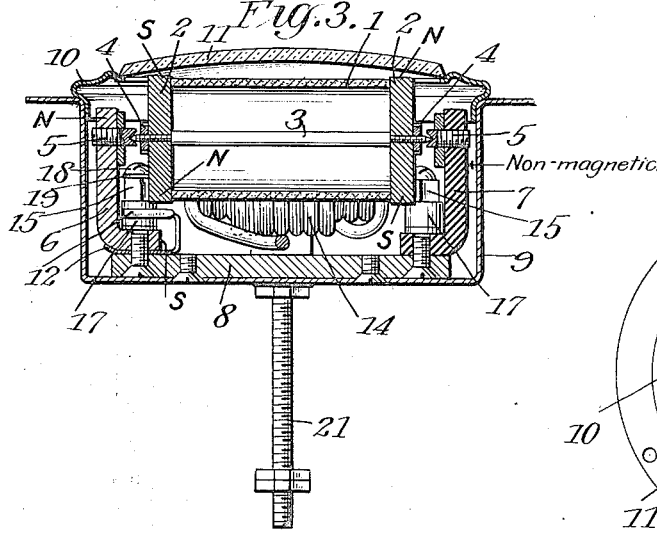
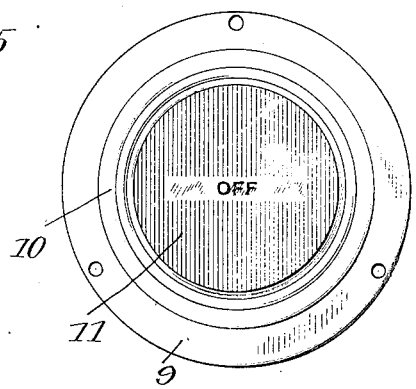
WITNESSES
H. Locheron
mm. Ashley Kelley
INVENTOR
Walter E. Beede
BY
Henry D. Williams
ATTORNEY

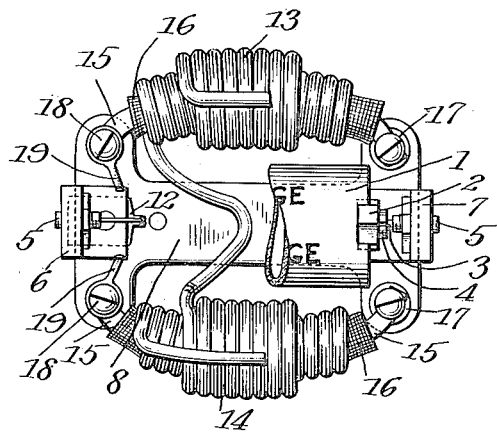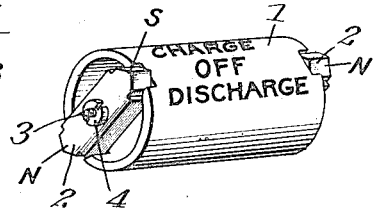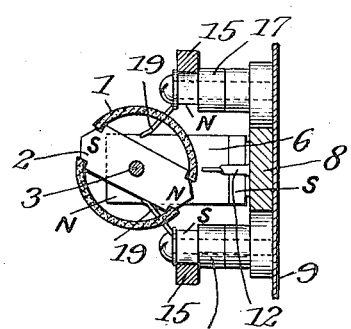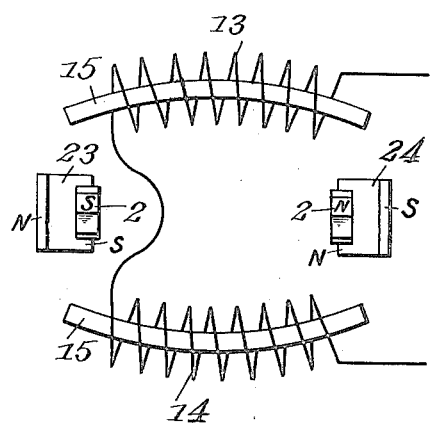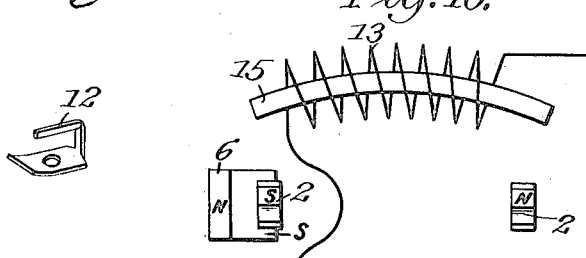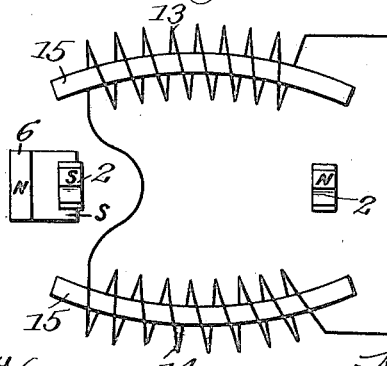

UNITED STATES PATENT OFFICE.

WALTER E. BEEDE, OF NEW YORK, N. Y.

CIRCUIT-INDICATOR.

1,248,246.

Specification of Letters Patent.   Patented Nov. 27, 1917.

Application filed January 17, 1914.   Serial No. 812,717.

*To all whom it may concern:*

Be it known that I, WALTER E. BEEDE, a citizen of the United States, residing at the borough of Manhattan, city of New York, in the county of New York and State of New York, have invented certain new and useful Improvements in Circuit-Indicators, of which the following is a specification, reference being had therein to the accompanying drawings, forming part thereof.

My invention relates to electric circuit indicators, and the instrument of my invention is more particularly intended to be mounted on the dashboard or instrument board of an automobile and connected in the circuit to indicate whether a storage battery employed in an electric lighting or lighting and engine starting equipment is receiving a charge, or that current is being used therefrom, or that no current is flowing in either direction, as the case may be, and to give positively these three indications. In such electrical equipments, expensive measuring instruments have heretofore commonly been used, having a calibrated scale and constructed to show the strength of the current flowing to or from the storage battery, as well as its presence and direction. There is need, however, for an instrument which will clearly give the three positive indications mentioned, these being of prime importance, and which shall be of comparatively low cost and peculiarly adapted to the conditions existing in such use.

General objects of my invention are reliability, non-disturbance of the circuit in which the instrument is connected, and inexpensiveness of manufacture. More particular objects are unfaltering dependability of indication, complete and unhesitating shifting from one indicating position to another, operation by small current together with capacity for large currents without damage to the instrument, very small consumption of current in the instrument, certainty of operable condition, simplicity and ruggedness of construction in which small and delicate parts are obviated, and other objects and advantages which will hereinafter appear.

My invention includes features of construction and combinations of parts, as will appear from the following description.

I shall now describe the circuit indicators embodying my invention illustrated in the accompanying drawings and shall thereafter point out my invention in claims.

Figure 1 is a front elevation or face view of an instrument embodying my invention, with the cover removed.

Fig. 2 is a vertical section on a plane indicated by line 2—2 of Fig. 1 as viewed from the right.

Fig. 3 is a horizontal section on a plane indicated by line 3—3 of Fig. 1 as viewed from below.

Fig. 4 is a perspective of an insulating strip employed in the construction.

Fig. 5 is a face view of the instrument drawn to a reduced scale.

Fig. 6 is a view similar to Fig. 1 with parts omitted and broken away.

Fig. 7 is a vertical section on a plane indicated by line 7—7 of Fig. 1 as viewed from the right, but with the movable parts in a different indicating position.

Fig. 8 is a perspective of the indicating cylinder and its movable magnets.

Fig. 9 is a perspective of a polar extension of the stationary magnet.

Fig. 10 is a diagram of the magnets and electrical circuit of the instrument as seen from the front.

Fig. 11 is a similar diagram of a slightly modified construction employing two stationary magnets.

The circuit indicator illustrated in Figs. 1 to 10, inclusive, of the drawings will now be described. An axially pivoted indicating cylinder has a tubular peripheral shell 1 provided on its periphery with the three indications, "Charge", "Off" and "Discharge", these indicating words being shown as circumferentially angularly spaced apart about 30°. The indicating shell 1 may be of suitable non-magnetic material, such as celluloid, and that is the material employed in the instrument illustrated in the drawings. The shell 1 is notched at its ends and is clamped between bar magnets 2 notched at their ends to fit into the notches of the shell, as clearly appears in the drawings. The magnets 2 are parallel to one another and oppositely arranged as to their polarity, as is indicated in several figures of the drawings by the letters "N" and "S". The indications are shown as placed on the shell 1 so that the "Off" indication is in alinement with ends of the magnets 2, so that it will be exposed when the shell 1 is in the middle position particularly shown in Figs. 1 and 5. The magnets 2 carry the shell 1 and are shown as carried and clamped on a bearing arbor 3, which is shouldered against the magnets 2 and has its reduced end portions threaded and provided with nuts 4, and its extreme ends pointed to enter center bearings in pivot screws 5, these pivot screws 5 being threaded into L-shaped supports 6 and 7 and provided with jam nuts. In the instrument now being described, the support 6, appearing at the left in Figs. 1, 3, 6 and 10, is a magnet, and the other support 7, appearing at the right in Figs. 1, 3 and 6, is of non-magnetic material, such as brass. The foot portions of the L-shaped supports 6 and 7 extend to the rear of the movable magnets 2 and are shown as secured by means of screws to a base plate or frame 8, which is in turn similarly secured to the flat back of a thin sheet metal cylindrical casing 9, the frame 8 and casing 9 being of non-magnetic material. It will be seen that the stem portions of the L-shaped supports 6 and 7 project from the back of the casing 9 toward the front of the instrument. The magnetically polarized support 6 exerts a directive influence upon the adjacent movable magnet 2 of the indicating cylinder, and the relative polarization of these two magnets is such as magnetically to determine or fix the middle position of the indicating cylinder in which the indicating word "Off" will be directed toward the front of the instrument, as most clearly appears in Figs. 1 and 5, the magnetic polarity of the support 6 being indicated in some of the figures of the drawings by the letters "N" and "S". The cover of the casing 9 comprises a bezel ring 10 and a crystal glass 11 blackened at the back excepting at a central sight slot, as indicated in Fig. 5.

The ends of the movable magnets 2 are V-shaped so as to form salient dihedral angles providing sharp magnetism-concentrating edges running parallel to the axis of the arbor 3, both ends of both magnets 2 being thus formed for convenience and uniformity of construction. A piece of thin paramagnetic material forms a polar extension 12 for the foot end of the stationary magnet 6, and is shown (see Fig. 9) as of general U-shape and as clamped between the foot of the magnet 6 and the frame plate 8, and having a thin magnetism-concentrating edge which is closely adjacent to the corresponding sharp edge of the magnet 2 at that end of the indicating cylinder (Figs. 2 and 3) when the indicating cylinder is in the middle position, and this polar extension 12 coöperates with the sharp edge of this magnet 2 to produce a strongly locally intensified field which will magnetically sharply and strongly determine the middle position of the indicating cylinder, so that the "Off" indication will appear clearly through the sight opening of the glass 11 (Fig. 5), whenever there is no current flowing through the circuit in which the indicator is interposed.

Electrically controlled magnetic means are provided for magnetically rotatively shifting the indicating cylinder to one or the other of its extreme positions, so as to show the indication "Charge" or "Discharge," as the case may be, through the sight opening, according to the direction of current in the circuit, this current flowing in one direction when the storage battery is being charged and in the opposite direction when the storage battery is discharging. Such shifting means are shown as including coils 13 and 14, one coil at each side of and somewhat to the rear of the shell 1 of the indicating cylinder, these coils being slightly bowed or arched to better fit in the space between the indicating shell 1 and the cylindrical wall of the casing 9, as well as to bring the polar ends of the coils into closer proximity to the movable magnets 2 which are controlled by the coils 13 and 14. Both in order to strengthen and to more strongly concentrate or localize the magnetic fields produced by the coils 13 and 14, these coils are provided with non-magnetized paramagnetic cores 15, for example, of soft iron, of arcuate form, the ends of which project from the respective coils in proximity to the rear ends of the movable magnets 2, so that each movable magnet 2 has one of its poles substantially between the adjacent ends of the cores 15.

The magnetizing coils 13 and 14 are shown as formed of coarse wire, and this wire has an insulating covering, such as enamel, for insulating the turns of the coils, and the coils are further insulated from their cores by means of insulating sheaths 16, which may be formed by a winding of suitable insulating tape. The two magnetizing coils 13 and 14 are preferably formed of a single continuous wire continued from one coil to the other, as shown. The coils 13 and 14 are shown as arranged in series and are oppositely wound, so as to exert opposite magnetizing effects as to polarity, so that with current flowing through the coils in a given direction, corresponding ends of the cores 15 will be of opposite magnetic polarity, and both poles of both the cores will be reversed when the current is reversed and flows through the coils in the other direction. Thus it is apparent that both coils 13 and 14 will act jointly and in harmony upon both of the movable magnets 2 to displace them, and with them the indicating shell 1, rotatively in one direction or the other, according to the polarity of the cores 15 as determined by the direction of current in the coils 13 and 14. For example, should the current flow in through the coil 13 and out through the coil 14, the core of the coil 13 will be of north polarity and the core of the coil 14 of south polarity at their ends adjacent to the stationary magnet 6, as is indicated in Fig. 7, and the movable magnet 2 adjacent to the stationary magnet 6 will be influenced, in opposition to the magnetic control of the stationary magnet 6, to cause its rear end to move downward to give the "discharge" indication (see Fig. 7) and the other movable magnet 2, whose movement is unopposed (the support 7 being non-magnetic) will be in like manner influenced by the coils and their cores and the indicating cylinder will be forcefully actuated to give the desired indication.

The several parts are relatively so proportioned electrically and magnetically that a very small current in the coils 13 and 14 will develop sufficient magnetism to overcome the biasing effect of the stationary magnet 6 and shift the indicating cylinder to one of its extreme positions. On the other hand, and in part at least because of the large diameter of the wire in the coils, the instrument will not be damaged by the heaviest current ever employed in the systems in which the instrument is intended to be used, and, furthermore, the resistance of the coils 13 and 14 is so small that consumption of electrical energy by the instrument itself is negligible.

The cores 15 serve to support the coils 13 and 14, and these cores are supported at their ends on non-magnetic posts, shown as made up of spacing blocks 17, screws 18 passing through the ends of the cores 15 and through the blocks 17 into the frame plate 8, which is shown as of I-shape.

Positive stops or abutments 19 are provided at the extreme positions of the indicating cylinder so as to stop the cylinder at the position where the indication "Charge" or "Discharge," as the case may be, will be clearly visible through the sight opening in the coloring of the crystal 11. The stops 19 are of non-magnetic sheet metal, each having a washer-like portion held by one of the core-holding screws 18 and a projecting tongue portion in the path of one of the movable magnets 2. In the drawings, two stops 19 are shown as employed, both at the same end of the indicating cylinder and at the same end thereof as the stationary magnet 6, but it is clearly a matter of indifference as to which end of the cylinder engages these stops or as to whether they are both at the same end. The projecting tongues of the stops 19 may be bent for the purpose of effecting adjustment. The relative disposition or arrangement of the several parts is such that the indicating cylinder will be firmly magnetically held by the electro-magnets 15 against the one or the other of the stops 19 when the coils and cores are energized. These stops 19 also provide for conveniently positively alining the indications with the sight opening.

The free ends of the coils 13 and 14 are shown as soldered to conductive strips 20 which are held in place by and are electrically continuous with conductive attaching legs 21, which also serve as binding posts for the circuit wires. The conductive strips 20 are insulated from the casing 9 by non-conductive strips 22 (see Fig. 4) and the legs 21 are also insulated from the casing, as shown.

In the operation of the instrument, as described, the total magnetism of the two movable magnets 2 is made use of for shifting the indicating cylinder from its middle position to an extreme position, whereas only one of these movable magnets, that one adjacent to the stationary magnet 6, is made use of in the biasing operation as to the middle position. This construction enables the instrument to give a "Charge" or "Discharge" indication with a very light current. All of the magnetic fields, both permanent and electrically controlled, are strongly localized, and this, together with the general arrangement of parts, results in such a distribution and balancing of magnetic forces that once a shifting movement of the indicating cylinder is begun it will be completed, the indicating shell 1 being quickly shifted from one indicating position to another. Upon the flowing of a very slight current in the coils 13 and 14, sufficient magnetism will thereby be developed in coöperation with both the movable magnets 2 to pull the biased one of these movable magnets out of the concentrated portion of the field existing between its sharp end and the thin edge of the polar extension 12 of the stationary biasing magnet 6, and the indicating cylinder will be continuously moved strongly and quickly to an extreme indicating position where it will be stopped by one of the abutment stops 19 against which it will be firmly held by the electro-magnetic action of the coils 13 and 14 and their cores 15. Upon cessation of current in the coils 13 and 14, the electro-magnetic action ceases and the indicating cylinder is promptly returned to its middle position by the permanent magnet 6 coöperating with the adjacent movable magnet 2 and is strongly brought entirely to the middle position and securely held there by the concentration or localization of the field between the thin polar extension 12 and the sharp angular end of the magnet 2. Because of this strong localization of the field at the middle position, any slight residual magnetism which may sometimes temporarily persist in the paramagnetic cores 15 will be completely counteracted and the indicating cylinder brought with precision correctly to its middle position. Also the locally intensified field quickly checks oscillation of the indicating cylinder at the middle position and renders it very nearly dead beat.

Instead of employing a single stationary magnet such as 6, two stationary magnetic supports, corresponding to the supports 6 and 7, may be employed, but each having in this case only one-half the cross-sectional area of the magnet 6, so as jointly to exert the same directional influence as does the single magnet 6. Such a construction is illustrated diagrammatically in Fig. 11 of the drawings. In this modified construction, two stationary magnets 23 and 24 are employed, one adjacent to each of the movable magnets 2, the stationary magnets 23 and 24 being oppositely polarized as indicated and each being of one-half the magnetic strength of the stationary magnet 6, as indicated by the correspondingly decreased thickness, as shown in this figure of the drawings. In other respects than noted, this instrument may be of similar construction to that described in reference to Figs. 1 to 10, inclusive, of the drawings.

The polarity indications "N" and "S" placed on the drawings are merely employed for clearness of illustration and description and are to be understood as being only relative. It will be seen that all of the magnets could be of opposite or reverse polarity to that indicated without affecting the operation of the instrument. It is also understood, of course, that care should be exercised to connect the instrument properly in the circuit.

It is obvious that various modifications may be made in the constructions shown in the drawings and above particularly described within the principle and scope of my invention.

I claim:

1. A circuit indicator comprising, in combination, a magnetically polarized member pivoted for movement to two extreme indicating positions at opposite sides of a middle indicating position, means magnetically coöperative with the magnetically polarized member to hold it in the middle position when no current is flowing through said circuit, and a pair of electro-magnets of opposed polarity in proximity to the magnetically polarized member and coöperative therewith to shift the magnetically polarized member to one or the other of its extreme positions.

2. A circuit indicator comprising, in combination, a magnetically polarized member pivoted for movement to two extreme indicating positions at opposite sides of a middle indicating position, stops for such member at its extreme positions, means magnetically coöperative with the magnetically polarized member to hold it in the middle position when no current is flowing through said circuit, and a pair of electro-magnets of opposed polarity in proximity to the magnetically polarized member and arranged to coöperate therewith to shift the magnetically polarized member to one or the other of its extreme positions.

3. A circuit indicator comprising, in combination, a pivotally mounted indicating member movable to two extreme indicating positions at opposite sides of a middle indicating position, a pair of substantially parallel oppositely arranged bar magnets movable with the indicating member and extending transversely to its pivotal axis, a stationary permanent magnet in control of one only of the movable magnets for magnetically determining the middle position of the indicating member, and electrically controlled magnetic means coöperative with both of the movable magnets for magnetically shifting the indicating member to one or the other of its extreme positions.

4. A circuit indicator comprising, in combination, a pair of magnetically unconnected permanent magnets mounted to move pivotally together with like poles at opposite sides of the pivotal axis, a paramagnetic member for magnetically holding the pivoted pair of magnets at one indicating position, and electrically controlled magnetic means for moving such pair of magnets to another indicating position.

5. A circuit indicator comprising, in combination, an indicating member pivotally mounted for movement to two extreme indicating positions at opposite sides of a middle indicating position, a supporting frame, an L-shaped stationary magnet having its foot portion secured to the frame and having its stem portion projecting therefrom and forming a pivotal support for the indicating member, a movable magnet forming a support for the indicating member and pivotally supported on the projecting stem of the stationary magnet and coöperative therewith to determine magnetically the middle position of the indicating member, and an electric coil for magnetically influencing the movable magnet in opposition to the stationary magnet for shifting the indicating member to one or the other of its extreme positions according to the direction of electric current in the coil.

6. A circuit indicator comprising, in combination, an indicating member pivoted for rotative movement to two extreme indicating positions at opposite sides of a middle indicating position, two bar magnets movable with the indicating member mounted in substantially parallel relation with unlike poles at the same side of the axis of the pivot of the indicating member, a stationary magnet adjacent to one of the movable magnets and coöperative therewith for magnetically determining the middle position of the indicating member, and an electro-magnet coöperative with both of the movable magnets for magnetically shifting the indicating member to one or the other of its extreme positions according to the polarity imparted to the electro-magnet.

7. A circuit indicator comprising, in combination, an indicating member pivoted for rotative movement to two extreme indicating positions at opposite sides of a middle indicating position, two bar magnets movable with the indicating member mounted in substantially parallel relation with unlike poles at the same side of the axis of the pivot of the indicating member, a stationary magnet adjacent to one of the movable magnets and coöperative therewith for magnetically determining the middle position of the indicating member, and a pair of electro-magnets in proximity to the movable magnets and arranged to act in harmony on the movable magnets to shift the indicating member to one or the other of its extreme positions.

8. A circuit indicator comprising, in combination, an indicating member pivoted for rotative movement to two extreme indicating positions at opposite sides of a middle indicating position, two bar magnets pivotally movable with the indicating member mounted in substantially parallel relation with unlike poles at the same side of the axis of the pivot of the indicating member, a stationary magnet adjacent to one of the movable magnets and coöperative therewith for magnetically determining the middle position of the indicating member, and a pair of electro-magnets one of which is located at one side and the other at the other side of an axial plane passing through the pivotally movable magnets longitudinally thereof, these electro-magnets having their length in the general direction of the axis of the pivot of the indicating member and having their poles oppositely arranged so that poles of opposite polarity will be adjacent to the same movable magnet, whereby the electro-magnets act in harmony on the movable bar magnets to shift the indicating member to one or the other of its extreme positions to determined by the direction of current imparting polarity to the electro-magnets.

9. A circuit indicator comprising, in combination, a pivotally mounted indicating member movable to two extreme indicating positions at opposite sides of a middle indicating position, a pair of substantially parallel oppositely arranged bar magnets movable with the indicating member and extending transversely to its pivotal axis, spaced pivotal supports for the movable magnets and indicating member, one of such supports being a magnet and adjacent to one of the movable magnets for magnetically determining the middle position of the indicating member, and electrically controlled magnetic means coöperative with both of the movable magnets for magnetically shifting the indicating member to one or the other of its extreme positions.

10. A circuit indicator comprising, in combination, a plurality of magnetically disconnected movable permanent magnets mounted for concerted movement, a stationary magnet controlling less than the whole number of such movable magnets to give one indication, and electrically controlled magnetic means in control of all of such movable magnets to give another indication.

11. A circuit indicator comprising, in combination, a pair of movable permanent magnets mounted to move pivotally together but magnetically disconnected from each other, a stationary permanent magnet in control of one only of the movable magnets for giving one indication, and electrically controlled magnetic means in control of both of the movable magnets for giving another indication.

12. A circuit indicator comprising, in combination, an axially pivoted indicating cylinder, a magnet on the cylinder at each end thereof and movable therewith, a stationary magnet adjacent to one of the movable magnets and coöperative therewith magnetically to determine one of the indicating positions of the cylinder, and electrically controlled magnetic means in control of both of the movable magnets for shifting the cylinder to another indicating position.

13. A circuit indicator comprising, in combination, a magnetically polarized member pivoted for movement to two extreme indicating positions at opposite sides of a middle indicating position, a stationary paramagnetic member for magnetically determining the middle position of the pivoted member, the movable and stationary member each having an edge-like portion projecting toward the other so to produce a strongly locally intensified magnetic field for sharply magnetically fixing the middle position of the movable member, and electrically controlled magnetic means for magnetically shifting the movable member to one or the other of its extreme positions according to the polarity imparted to the electrically controlled magnetic means as determined by the direction of the current in the circuit.

14. A circuit indicator comprising, in combination, a magnetically polarized member pivoted for movement to two extreme indicating positions at opposite sides of a middle indicating position and having a magnetism-concentrating edge, a stationary magnetically polarized member for magnetically determining the middle position of the pivoted polarized member, a paramagnetic polar extension on the stationary polarized member having a magnetism-concentrating edge adjacent to the edge of the pivoted polarized member at the middle position of the latter for magnetically sharply determining such middle position, and electrically controlled magnetic means for magnetically shifting the pivoted polarized member to one or the other of its extreme positions.

15. A circuit indicator comprising, in combination, an indicating member pivotally mounted for movement to two extreme indicating positions at opposite sides of a middle indicating position, a supporting frame, a stationary magnet supported on the frame and forming a pivotal support for the indicating member, a movable magnet pivotally supported on the stationary magnet and supporting the indicating member, the movable magnet being coöperative with the stationary magnet to determine magnetically the middle position of the indicating member, a paramagnetic core-piece supported on the frame, and an electric coil on the core-piece, the coil and its core co-acting to influence magnetically the movable magnet and shift the indicating member to one or the other of its extreme positions according to the direction of electric current in the coil.

In testimony whereof I have affixed my signature in presence of two witnesses.

WALTER E. BEEDE.

Witnesses:
WM. ASHLEY KELLY,
BERNARD COWEN.